US010926953B2

(12) United States Patent
Grabbe et al.

(10) Patent No.: US 10,926,953 B2
(45) Date of Patent: Feb. 23, 2021

(54) CONTROL OF AT LEAST TWO MOBILE INDUSTRIAL TRUCKS IN A GOODS LOGISTICS FACILITY

(71) Applicant: Jungheinrich AG, Hamburg (DE)

(72) Inventors: Florian Grabbe, Hamburg (DE); Stefan Ahrens, Rellingen (DE); Sven-Ole Heise, Osterrönfeld (DE); Jan Kopelke, Hamburg (DE); Tony Altmann, Brokstedt (DE)

(73) Assignee: Jungheinrich AG, Hamburg (DE)

( * ) Notice: Subject to any disclaimer, the term of this patent is extended or adjusted under 35 U.S.C. 154(b) by 86 days.

(21) Appl. No.: 16/292,424

(22) Filed: Mar. 5, 2019

(65) Prior Publication Data

US 2019/0270589 A1    Sep. 5, 2019

(30) Foreign Application Priority Data

Mar. 5, 2018 (DE) .................. 10 2018 104 984.6

(51) Int. Cl.

| | |
|---|---|
| *G06F 7/00* | (2006.01) |
| *B65G 1/137* | (2006.01) |
| *B66F 9/06* | (2006.01) |
| *G05D 1/02* | (2020.01) |
| *B66F 9/24* | (2006.01) |

(52) U.S. Cl.
CPC ............ *B65G 1/1373* (2013.01); *B66F 9/063* (2013.01); *B66F 9/24* (2013.01); *G05D 1/0291* (2013.01)

(58) Field of Classification Search
CPC ..... B65G 1/1373; B65G 1/0492; B66F 9/063; B66F 9/24; G05D 1/0291

USPC ......................................... 700/213–216, 228
See application file for complete search history.

(56) References Cited

U.S. PATENT DOCUMENTS

| | | | |
|---|---|---|---|
| 4,780,817 A | * | 10/1988 | Lofgren ............... G05D 1/0265 180/168 |
| 8,165,746 B2 | | 4/2012 | Tueshaus |
| 8,731,786 B2 | | 5/2014 | Tueshaus |
| 10,077,177 B2 | | 9/2018 | Lynn et al. |

(Continued)

FOREIGN PATENT DOCUMENTS

| | | |
|---|---|---|
| DE | 102006040197 A1 | 3/2008 |
| DE | 102010005034 A1 | 7/2011 |

(Continued)

*Primary Examiner* — Yolanda R Cumbess
(74) *Attorney, Agent, or Firm* — Rankin, Hill & Clark LLP

(57) ABSTRACT

A method for controlling at least two movable industrial trucks (30.1, 30.2, 30.3, 30.4, 30.5) in an area of a goods logistics facility (10). The industrial trucks each have an industrial truck drive control device for controlling the travel movements of the respective industrial truck, which is connected, preferably by wireless means, with a control apparatus (40) of the goods logistics facility, which is central and/or stationary. Individual travel movement control commands and/or individual industrial truck identifications are sent by the control apparatus to the respective industrial truck drive control devices of the industrial trucks so that in a local region (25) of the areas of the goods logistics facility, in which the industrial trucks are moved simultaneously, and preferably driven, the industrial trucks are moved or are drivable in a manner dependent on the individual travel movement control commands and/or dependent on the individual industrial truck identifications.

12 Claims, 1 Drawing Sheet

(56) References Cited

U.S. PATENT DOCUMENTS

| | | |
|---|---|---|
| 2007/0069907 A1 | 3/2007 | Magens |
| 2008/0051952 A1 | 2/2008 | Tushaus |
| 2011/0010023 A1 | 1/2011 | Kunzig et al. |
| 2012/0046809 A1 | 2/2012 | Wellman |
| 2012/0143446 A1 | 6/2012 | Tüshaus |
| 2013/0190963 A1 | 7/2013 | Kuss et al. |
| 2015/0175397 A1 | 6/2015 | Lynn et al. |
| 2016/0180713 A1* | 6/2016 | Bernhardt ............ B66F 17/003 701/70 |
| 2017/0017236 A1* | 1/2017 | Song ...................... G08G 1/165 |

FOREIGN PATENT DOCUMENTS

| | | |
|---|---|---|
| DE | 102012020617 A1 | 5/2014 |
| EP | 1767488 A2 | 3/2007 |
| EP | 2886507 A1 | 6/2015 |
| EP | 3035074 A1 | 6/2016 |

* cited by examiner

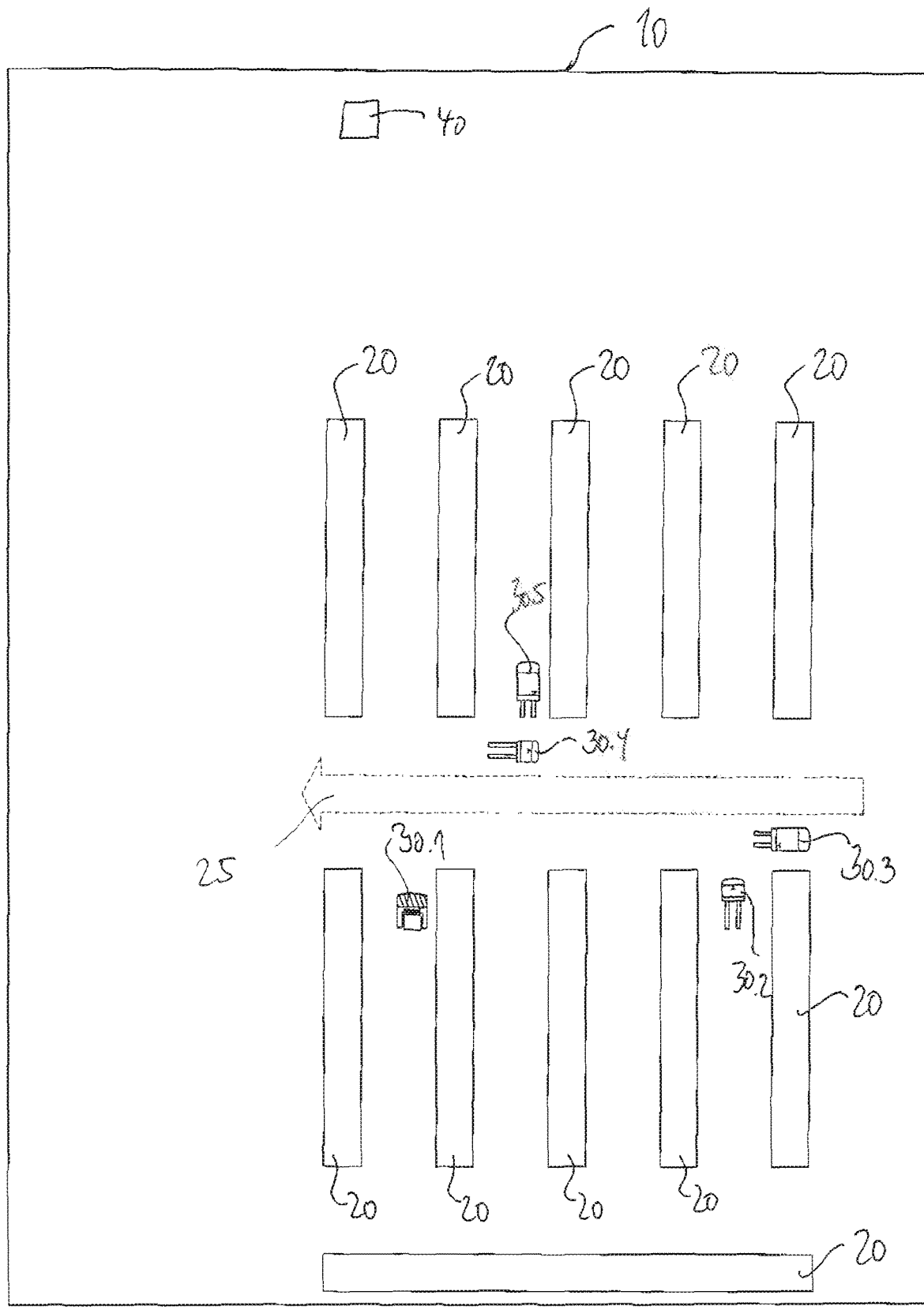

CONTROL OF AT LEAST TWO MOBILE INDUSTRIAL TRUCKS IN A GOODS LOGISTICS FACILITY

PRIORITY CLAIM

This application claims priority to DE 10 2018 104 984.6, filed Mar. 5, 2018, which is hereby incorporated by reference in its entirety.

BACKGROUND OF INVENTION

Field of Invention

The invention relates to a method for controlling at least two movable, driver-operated industrial trucks at least in a local region of a goods logistics facility. The invention further relates to an industrial truck control system for a goods logistics facility with at least two movable, driver-operated industrial trucks of the goods logistics facility.

Brief Description of Related Art

It is known in the prior art that industrial trucks in logistics facilities, for example in warehouses or high-bay storage facilities for goods and products, must be moved with greatest possible speed in order to transport the goods and products in a fast and efficient manner from or to their storage locations. Various industrial trucks are generally used for this; they are guided by operating personnel or a driver or automatically, for example by the use of induction loops or the like.

In order to support a driver of an industrial truck in handling the industrial truck, for example, EP 1 767 488 A2 discloses a system for supporting a driver of an industrial truck during travel. Furthermore, DE 10 2010 005 034 A1 describes a method for management of a storage facility with an industrial truck.

Driving assistance systems are also used on or in the industrial trucks in order to guide the industrial trucks, whereby the industrial truck is influenced or the driver is informed, for example, if driving ought to be slower in an area of risk or if no goods should be placed on particular surfaces or in particular areas. Such limitations in the guidance of industrial trucks are locally limited in each case and consequently concern only individual zones within a goods logistics facility.

The object of the invention is to constitute the handling of multiple industrial trucks in a goods logistics facility more effectively.

BRIEF SUMMARY OF THE INVENTION

This object is solved by a method for controlling at least two movable, driver-operated industrial trucks at least in a local region of a goods logistics facility, wherein each industrial truck has an industrial truck drive control device for controlling the travel movements of the respective industrial truck independent of the driver. In this method, the industrial truck drive control devices are connected with a central and/or stationary control apparatus of the goods logistics facility. The connection between the central and/or stationary control apparatus of the goods logistics facility and the industrial truck drive control devices may be wireless. The individual travel movement control commands or individual industrial truck identifications are sent by the control apparatus of the goods logistics facility to the individual drive control device of the respective industrial trucks. Individual travel movement control commands and/or individual industrial truck identifications are sent so that in a local region of the goods logistics facility in which the industrial trucks are simultaneously driven, the driver-operated industrial trucks are controlled by the industrial truck drive control devices so as to be driven in a manner dependent on the individual travel movement control commands and/or dependent on the individual industrial truck identifications.

In accordance with the invention, the industrial truck drive control devices, such as the onboard assistance systems of the industrial truck, are connected with the control apparatus of the goods logistics facility. Thus, the industrial truck drive control devices are put in a position to make intelligent and efficient decisions independent of their driver for their conveying path based on the travel movement control commands and/or industrial truck identifications received because important data or information regarding the goods conveyed or to be conveyed is taken into account by the control apparatus of the goods logistics facility for the travel movement control commands and/or industrial truck identifications.

If, for example, goods are to be conveyed which are especially fragile or heavy, this information is transmitted to an industrial truck drive control device of an industrial truck, which causes the drive control device of the industrial truck to recognize that the industrial truck is not permitted to drive through the goods logistics facility at high speeds. Furthermore, the maximum speed envisaged for the transport of the fragile or heavy goods can also or alternatively be transmitted by the control device of the goods logistics facility to the corresponding industrial truck drive control apparatus of the industrial truck provided for the transport.

In a preferred embodiment, the industrial truck identifications, such as prioritizations or individual travel movement control commands corresponding to the prioritizations, are transmitted from the control apparatus of the goods logistics facility to the various industrial truck drive control devices, which makes it possible to send corresponding individual control commands for the respective industrial trucks to the industrial truck drive control devices. This results in a (preferably temporary) sequence of the industrial trucks used or of the industrial trucks which are found in use. This enables, for example, industrial trucks with a task of high importance or urgency to be given the right of way versus industrial trucks with a task of lesser importance at a narrow point in the area of the goods logistics facility. In order, for example, to accomplish or ensure the right of way at the narrow point for the industrial truck with the higher priority, corresponding travel movement control commands are transmitted, for example, from the control apparatus of the goods logistics facility to the industrial truck drive control devices of the industrial trucks, which, for example, causes an industrial truck with a lower priority to be braked or driven more slowly in the area of the narrow point or in the area of the goods logistics facility, doing so in an automatic manner (i.e., independent of the driver).

Furthermore, it is possible to transmit from the control apparatus of the goods logistics facility to the drive control devices of the industrial trucks data on the type of goods to be transported, such as size, weight, etc., or corresponding control commands as a function of the data regarding the goods to be transported.

The inventive method makes simultaneous operation of multiple industrial trucks possible in the area of a goods logistics facility, for example in a warehouse, high-bay storage facility or the like, which achieves efficient operation of the industrial trucks in the goods logistics facility taking into account the goods transported or to be transported with the respective industrial trucks and taking into account the corresponding information or data for the goods transported or to be transported. This ensures, for example, that goods for an important task are conveyed with particular speed by an industrial truck from a storage location to a delivery point because the permitted maximum speeds for the other industrial trucks with tasks of lesser importance are limited by the control device of the goods logistics facility and/or the respective industrial truck with the important and urgent task can be preferentially operated with a higher priority compared to the other industrial trucks for a predetermined period of time.

According to a preferred aspect of the method, it is further envisaged that the industrial trucks be provided with different priority designations by means of the individual travel movement control commands and/or by means of the individual industrial truck identifications, so that the industrial truck provided with a higher priority designation is moved (driven) or can be moved (driven), first in the local area compared to an industrial truck provided with a lower priority designation. This links a sequence in the processing of conveyance tasks in the goods logistics facility to an order of precedence for the industrial trucks within the prioritizations. Here the local area is a subarea or subsection of the entire area of the goods logistics facility in which at least two industrial trucks are or can be moved in the local area or partial region of the entire area.

This method is advantageously provided such that, at a narrow point in the local area in which the industrial trucks are moved simultaneously, the industrial truck with a higher priority designation is or can be moved with priority versus an industrial truck with a lower priority designation.

In another embodiment, the individual travel movement control commands and/or the individual industrial truck identifications are shown by means of a display unit for the industrial trucks. This shows a driver of the industrial truck important information via a monitor or the like, for example, regarding the goods conveyed or the maximum speed of the industrial truck and/or a better and/or shorter period of time for the industrial truck on the stretch to be driven.

It is advantageous that the individual travel movement control commands and/or the individual industrial truck identifications be deleted after a predetermined period of time subsequent to transmission to the industrial truck drive control devices. The result of this is, for example, that industrial trucks with important tasks are only provided with higher prioritization than the other industrial trucks for this period of time. After delivery of the goods at the delivery point, it is possible that the individual travel movement control commands and/or the individual industrial truck identifications be deleted, most preferably in an automatic manner.

In the preferred method, the industrial truck may be braked during its travel as a function of an individual travel movement control command and/or as a function of an individual industrial truck identification for a predetermined period of time.

Individual travel movement control commands and/or the individual industrial truck identifications are preferably configured for an industrial truck by the control device of the goods logistics facility taking into account the capabilities of a vehicle driver for the respective industrial truck. This makes it possible, for example, that the driving qualification and/or driving capabilities and/or professional experience of a vehicle driver be recorded in or by the control apparatus of the goods logistics facility, so that, taking into account the capabilities of the industrial truck operator or driver, corresponding travel movement control commands and/or industrial truck identifications are transmitted to the industrial truck drive control device of the industrial truck which the industrial truck driver operates. For example, a higher maximum speed is transmitted as a travel movement control command to an industrial truck by the central control apparatus of the goods logistics facility so that the industrial truck can be moved faster by the vehicle driver compared to an industrial truck which is guided or driven by a vehicle driver with less knowledge and/or capability and/or less professional experience, etc. This enables higher speeds to be permitted by the control device of the goods logistics facility for an industrial truck with a driver having many years of experience.

In a further embodiment, the individual travel movement control commands and/or the individual industrial truck identifications for an industrial truck be configured by the control device of the goods logistics facility taking into account the urgency of a conveyance task and/or taking into account the operation time of the industrial truck. This makes it possible, for example, that in periods of time in which a shift change occurs for personnel in the goods logistics facility, the industrial trucks are fundamentally permitted to drive at a lower maximum speed in order not to endanger these persons on account of the higher number of persons in the goods logistics facility. Here the control device of the goods logistics facility transmits to the industrial truck drive control devices of the industrial trucks the travel movement control commands for a predetermined time period or corresponding control commands for a predetermined duration, so that the industrial trucks are not permitted to exceed predetermined speeds when transporting the goods. As part of the invention is also possible that the travel movement control commands be transmitted in real-time and/or online by the control device of the goods logistics facility to the industrial truck drive control devices of the industrial trucks. It is envisaged, for example, that a maximum speed of an industrial truck in the local area be determined in real time as a travel movement control command by the control device and transmitted in real time to the industrial truck.

Within the framework of the invention, it is also possible that the individual travel movement control commands and/or the individual industrial truck identifications for an industrial truck be configured by the control device of the goods logistics facility taking into account the number of industrial trucks used in the area of the goods logistics facility. If, for example, few vehicles are operated simultaneously in the goods logistics facility, then control commands are transmitted by the control device of the goods logistics facility to the industrial trucks used, so that these are permitted to drive at a higher speed than they would be at times in which many industrial trucks are used.

Moreover, in one embodiment of the method it is preferred that the individual travel movement control commands and/or the individual industrial truck identifications for an industrial truck be produced by the control device of the goods logistics facility taking into account the traffic density of industrial trucks in the area of the goods logistics facility.

In one embodiment, the individual travel movement control commands and/or the individual industrial truck identifications for an industrial truck are produced by means of the control device of the goods logistics facility taking into account blockages of local conveying paths for the industrial trucks in the area of the goods logistics facility.

It is preferred that the individual travel movement control commands and/or the individual industrial truck identifications for an industrial truck be produced by means of the control device of the goods logistics facility taking into account navigation routes for the industrial trucks in the area of the goods logistics facility.

Here, for example, the control device of the goods logistics facility determines navigation routes for individual industrial trucks, for example to provide a route for an industrial truck with which the industrial truck is guided faster through the goods logistics facility or the industrial truck is driven continuously on the conveying path from a pickup point to a delivery point in the goods logistics facility without any stops. This makes it possible, for example, for the industrial truck to circumvent areas in which there is a high traffic volume of industrial trucks.

Thus, the object is solved by an industrial truck control system for a goods logistics facility with at least two drivable industrial trucks in an area of the goods logistics facility, in which the industrial truck control system can be or is operated according to the previously described method. To avoid repetition, explicit reference is made to the explanations above.

Further features of the invention will become evident from the description of the inventive embodiments together with the claims and the attached drawing. Inventive embodiments can implement individual features or a combination of multiple features.

BRIEF DESCRIPTION OF THE DRAWINGS

The invention is described below, without restricting the general inventive concept, based on an exemplary embodiment with reference to the drawing; with regard to all inventive details not explained further in the text, explicit reference is made herewith to the drawing. It shows in:

FIG. 1 a simplified schematic representation of a goods logistics facility.

DETAILED DESCRIPTION OF THE INVENTION

FIG. 1 shows a simplified representation of a goods logistics facility 10, for example embodied as a warehouse or the like. The goods logistics facility 10 comprises, for example, a warehouse in which multiple racks 20 are situated adjacent to one another. Here, corresponding goods are stacked on or removed from the racks 20. Furthermore, drivable industrial trucks 30.1, 30.2, 30.3, 30.4, 30.5 are provided in the goods logistics facility 10, so that the goods can be brought to the racks 20 or transported away from the racks 20 by means of the industrial trucks 30.1 to 30.5.

The goods logistics facility 10 also includes a main computer 40, which is connected to the industrial trucks 30.1 to 30.5 in a wireless manner via corresponding transmitting and receiving units. Here the main computer 40 is connected wirelessly to the onboard drive control devices (not shown). For example, the drive control devices of the respective industrial trucks 30.1 to 30.5 are configured as driving assistance systems and have corresponding display fields to show corresponding information to the operating personnel or the driver in a visual manner.

The main computer 40 is preferably part of a goods management system with which the warehouse management or management of goods which are put in storage and removed therefrom is conducted. Here, along with data on the goods placed in storage, additional information regarding the goods is also saved, such as the size, weight and additional information on fragility, etc. Furthermore, there is also additional information in the main computer regarding the industrial trucks 30.1 to 30.5 used or made available as well as regarding the persons or drivers who operate and drive the industrial trucks 30.1 to 30.5.

There are preferably multiple areas provided in the goods logistics facility 10, in which special rules apply for the industrial trucks 30.1 to 30.5. For example, an area can be provided in which no industrial truck 30.1 to 30.5 is permitted to unload goods. Here corresponding rules are assigned for the industrial trucks 30.1 to 30.5 in the various areas. For example, between the high-bay storage facilities 20 there is a local region or an area 25 envisaged in which industrial trucks 30.1 to 30.5 are permitted to drive at a higher speed in the manner of an expressway, where industrial trucks 30.1 to 30.5 for which a higher maximum speed applies are carrying out a particularly urgent task or goods delivery. Here one of the industrial trucks 30.1 to 30.5 with which the urgent task and quick goods delivery is to be performed is provided with a higher prioritization by the main computer 40 and at the same time the other industrial trucks which are to carry out less important or less urgent tasks are provided with a lower prioritization. In this way, the corresponding drivers of the industrial trucks 30.1 to 30.5 are shown, by means of a display on the industrial trucks 30.1 to 30.5, that the vehicle with the high prioritization is permitted to be driven through the goods logistics facility 10 and also in the area 25 at a higher speed, while the other industrial trucks with the lower prioritization are braked by the transmission of a corresponding control command from the main computer 40 to the corresponding industrial trucks 30.1 to 30.5 or are permitted to be driven through the goods logistics facility 10 and in the area 25 only at a lower speed.

All of the indicated features, including those which are to be inferred from the drawing alone, as well as individual features which are disclosed in combination with other features, are deemed to be essential to the invention, both alone and in combination. Inventive embodiments can be fulfilled with individual characteristics or a combination of multiple characteristics. Within the context of the invention, features to which the terms "in particular" or "preferably" are applied are to be understood as optional features.

REFERENCE NUMBER LIST

10 Goods logistics facility
20 Rack
25 Local area
30.1 to 30.5 Industrial truck
40 Main computer

What is claimed is:

1. A method for controlling at least two driver-operated industrial trucks in a goods logistics facility, wherein each of the at least two driver-operated industrial trucks has an industrial truck drive control device configured to control travel movements of the industrial truck independent of the driver, and wherein each industrial truck drive control device is connected with a control device of the goods logistics facility that is at least one of central and stationary, the method comprising:

sending at least one of individual travel movement control commands and individual industrial truck identifications from the control device of the goods logistics facility to the respective industrial truck drive control devices of the at least two driver-operated industrial trucks; and at least in a local region of the goods logistics facility where the at least two driver-operated industrial trucks are moved simultaneously, controlling movement of at least one of the at least two driver-operated industrial trucks independent of its driver using its respective industrial truck drive control device in a manner that is dependent on the at least one of the individual travel movement control commands and the individual industrial truck identifications.

2. The method according to claim 1, wherein the at least two driver-operated industrial trucks are provided with different priority designations by the at least one of the individual travel movement control commands and the individual industrial truck identifications such that one of the at least two driver-operated industrial trucks provided with a higher priority designation is controlled by the industrial truck control devices independent of the drivers to be preferentially operated in the local region as compared to another of the at least two driver-operated industrial trucks provided with a lower priority designation.

3. The method according to claim 2, wherein at a narrow point in the local region where the at least two driver-operated industrial trucks are moved simultaneously, the one of the at least two driver-operated industrial trucks provided with the higher priority designation is controlled by the industrial control devices independent of the drivers to move with priority as compared to the another of the at least two driver-operated industrial trucks provided with the lower priority designation.

4. The method according to claim 1, wherein the at least one of the individual travel movement control commands and the individual industrial truck identifications sent to the respective industrial truck drive control devices of the at least two driver-operated industrial trucks is displayed on a display unit of the respective at least two industrial trucks.

5. The method according to claim 1, wherein the at least one of the individual travel movement control commands and the individual industrial truck identifications are deleted a predetermined period of time after being sent to the respective industrial truck drive control devices.

6. The method according to claim 1, wherein at least one of the at least two driver-operated industrial trucks is braked in the local region by the industrial truck control device for at least a predetermined period of time dependent on the at least one of the individual travel movement control commands and the individual industrial truck identifications.

7. The method according to claim 1, wherein the at least one of the individual travel movement control commands and the individual industrial truck identifications for a respective one of the at least two driver-operated industrial trucks takes into account capabilities of a vehicle driver of the respective one of the at least two driver-operated industrial trucks.

8. The method according to claim 1, wherein the at least one of the individual travel movement control commands and the individual industrial truck identifications for a respective one of the at least two driver-operated industrial trucks takes into account at least one of an urgency of a conveyance task and an operation time of a respective one of the at least two driver-operated industrial trucks as compared to another one of the at least two driver-operated industrial trucks.

9. The method according to claim 1, wherein the at least one of the individual travel movement control commands and the individual industrial truck identifications for a respective one of the at least two driver-operated industrial trucks takes into account a traffic density of industrial trucks in the local region of the goods logistics facility.

10. The method according to claim 1, wherein the at least one of the individual travel movement control commands and the individual industrial truck identifications for a respective one of the at least two driver-operated industrial trucks takes into account blockages of conveying paths for industrial trucks in the local region of the goods logistics facility.

11. The method according to claim 1, wherein the at least one of the individual travel movement control commands and the individual industrial truck identifications for a respective one of the at least two driver-operated industrial trucks takes into account navigation routes for industrial trucks in the local region of the goods logistics facility.

12. An industrial truck control system for a goods logistics facility having at least two driver-operated industrial trucks in an area of the goods logistics facility, wherein the industrial truck control system is operated according to a method of claim 1.

* * * * *